3,387,936
PROCESS FOR THE MANUFACTURE OF
TETRAPHOSPHORUS DISULFIDE
Armin Schneider and Rüdiger Förthmann, Clausthal-Zellerfeld, Germany, assignors to Knapsack Aktiengesellschaft, Knapsack, near Cologne, Germany, a corporation of Germany
Filed Apr. 21, 1966, Ser. No. 544,149
Claims priority, application Germany, May 28, 1965, K 56,245
12 Claims. (Cl. 23—206)

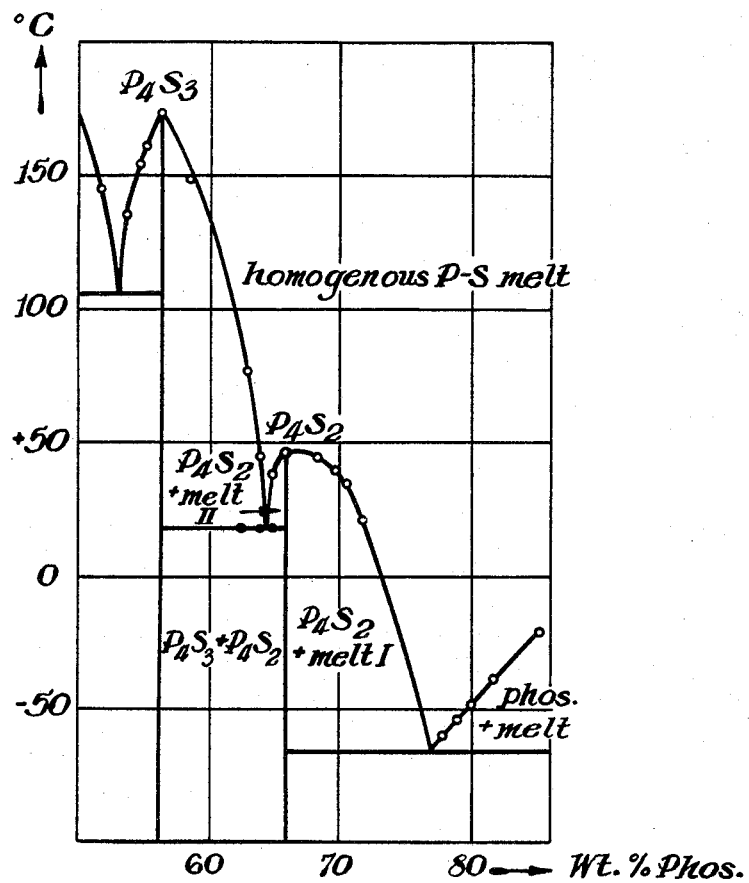

ABSTRACT OF THE DISCLOSURE

A phosphorous-sulfur compound of the formula $P_4S_2$ and a melting point of 47°±2° C. and a process for producing the same by melting yellow phosphorus with one of sulfur or a phosphorus-sulfur compound, in amounts corresponding approximately to the stoichiometric composition of $P_4S_2$, at a temperature of 47°–300° C. in the absence of air and moisture and thereafter cooling and quenching the resulting melt to obtain a crystalline product.

---

The following phosphorus-sulfur compounds had been reported heretofore in literature: $P_4S_{10}$, $P_4S_7$, $P_4S_6$, $P_4S_5$, $(PS)_n$ and $P_4S_3$.

It has now unexpectedly been found there also exists a further previously unknown phosphorus-sulfur compound, i.e. tetraphosphorus disulfide ($P_4S_2$) containing 66% by weight phosphorus, which can be used in a manner analogous to the known phosphorus-sulfur compounds to serve as a starting material for making insecticides or to serve as an additive therein. $P_4S_2$ is a substance which crystallizes in the form of yellow needles with a melting point of 47°C.±2°.

The process for making $P_4S_2$ comprises melting yellow phosphorus and sulfur or a phosphorus-sulfur compound and yellow phosphorus in proportions corresponding approximately to the stoichiometric composition of $P_4S_2$, or with excess yellow phosphorus at temperatures between 47 and 300° C., with the exclusion of air and moisture, and cooling or quenching then the resulting melt.

The phosphorus added should be used in excess, referred to the $P_4S_2$ desired to be obtained, for the reason that the phosphorus used partially undergoes transformation into red phosphorus, particularly at relatively high reaction temperatures, and would be unavailable for the reaction. The excess phosphorus used should preferably correspond approximately to the amount of red phosphorus formed.

As compared with the reaction of phosphorus and sulfur or higher sulfur compounds and phosphorus, the reaction of tetraphosphorus trisulfide with yellow phosphorus in a ratio by weight of $P_4S_3:P=3.55:1$, the phosphorus being preferably used in an excess of 0.5 to 2.0% by weight, referred to the final product desired to be obtained, offers considerable advantages because this latter reaction proceeds in the absence of any appreciable heat effect.

The $P_4S_3$ can be obtained intermediarily using yellow phosphorus and sulfur or a phosphorus-sulfur compound other than $P_4S_3$, e.g. $P_4S_7$ or $P_2S_5$, and yellow phosphorus as the starting materials.

The melt being readily inflammable, it is necessary to carry out the reaction with the exclusion of air and moisture.

At temperatures below —10° C., the melt has a pronounced and high viscosity and an extremely small rate of nuclei formation and nuclei growth. Crystallization temperatures near the melting point of $P_4S_2$ (47° C.) produce but poor yields owing to the position of the liquidus line (cf. the diagram annexed). The crystallization temperature should therefore be selected to vary within the range of —10 and +10° C.

The crystallized product can be purified, preferably by the following two methods comprising:
(a) Subjecting the crystals once they have been separated from the residual melt by conventional means to recrystallization in an appropriate solvent, e.g. carbon sulfide and similar substances capable of dissolving elementary colorless phosphorus, and
(b) Recrystallizing the $P_4S_2$ in the phosphorus-sulfur melt which is rich in phosphorus and of which the composition (cf. the diagram annexed) is selected to ensure the presence of a slight excess of phosphorus, with respect to the stoichiometric composition of $P_4S_2$, and to ensure exclusive crystallization of the $P_4S_2$ in the two phase region $P_4S_2$+melt I, which corresponds to a phosphorus-sulfur melt containing about 66 to 67% by weight phosphorus.

EXAMPLE 1

A reaction vessel provided with an installed frit was charged in the atmosphere of a protective gas with 1.5 parts by weight of purified, anhydrous phosphorus and with 5 parts by weight of pure $P_4S_3$, and the whole was melted while being stirred and heated. The resulting almost clear melt which contained a total of 66.5% by weight phosphorus was cooled down to 0° C. and maintained at that temperature for a period of 15 hours. $P_4S_2$ separated slowly in the form of crystals.

The crystallized $P_4S_2$ was separated by suction on the frit from the residual melt rich in phosphorus. Light yellow, needle-shaped crystals with some adherent residual melt were obtained. They melted at about 47° C.±2°.

EXAMPLE 2

A coolable reaction vessel provided with an installed frit was charged in the atmosphere of a protective gas with 4.4 parts by weight of sulfur and 7.5 parts by weight of purified, anhydrous phosphorus, and the whole was melted while being stirred and gently heated. The exothermal reaction produced a sudden temperature increase which was arrested by cooling, temperatures of about 200° C. being ultimately reached. After cooling down to 0° C. and after having been allowed to remain in the reaction vessel for a period of 12 hours, $P_4S_2$-crystals were removed by suction from the residual melt which contained a slight proportion of red phosphorus. The $P_4S_2$-crystals melted at 47° C.±2° once they had been recrystallized from carbon sulfide.

We claim:
1. A phosphorus-sulfur crystalline compound of the formula $P_4S_2$ containing about 66–66.5% by weight phosphorus, 34–33.5% by weight sulfur, a molecular weight of 188, and crystallizing in the form of yellow needles with a melting point of 47° C.±2° C.
2. A process for producing tetraphosphorus disulfide comprising melting yellow phosphorus with sulfur or a phosphorus-sulfur compound at 47° C.–300° C. in an amount corresponding approximately to the stoichiometric composition of $P_4S_2$ while excluding air and moisture, cooling the resulting melt to —10° through +10° C., and maintaining this temperature until crystallization is substantially complete.
3. A process of claim 2 wherein phosphorus-sulfur compound and yellow phosphorus are melted.
4. A process of claim 2 wherein the melt is quenched.
5. A process of claim 2 wherein the amount of phosphorus employed is in an excess with respect to the $P_4S_2$ product.
6. A process of claim 2 wherein tetraphosphorus trisulfide and elementary phosphorus in the ratio by weight of 3.55:1 are melted.

7. A process of claim 6 wherein phosphorus is employed in an excess of 0.5 to 2.0% by weight, with respect to the product.

8. A process of claim 6 wherein a tetraphosphorus trisulfide intermediate is obtained from phosphorus and sulfur.

9. A process of claim 6 wherein the tetraphosphorus trisulfide is produced from $P_4S_7$ and phosphorus.

10. A process of claim 3 wherein the tetraphosphorus trisulfide reactant is produced from $P_2S_5$ and phosphorus.

11. A process of claim 2 wherein the tetraphosphorus disulfile is purified by recrystallizing from carbon sulfide.

12. A process of claim 2 wherein the tetraphosphorus disulfide is purified by being recrystallized from a phosphorus-sulfur melt rich in phosphorus and containing about 66 to 67% by weight phosphorus.

References Cited

UNITED STATES PATENTS 3,183,062   5/1965   Taylor _____ 23—206

FOREIGN PATENTS 3,045   11/1902   Great Britain.
29,989   12/1910   Great Britain.

OTHER REFERENCES

"Chemical Abstracts," volume 29, page 7864, 1935.

OSCAR R. VERTIZ, *Primary Examiner.*

G. PETERS, *Assistant Examiner.*